Patented Aug. 22, 1950

2,520,084

UNITED STATES PATENT OFFICE 2,520,084

PLASTICIZED VINYL CHLORIDE POLYMERS

Joachim Dazzi, Dayton, Ohio, assignor to Monsanto Chemical Company, St. Louis, Mo., a corporation of Delaware No Drawing. Application May 27, 1948,
Serial No. 29,643

6 Claims. (Cl. 260—30.8)

This invention relates to compositions useful as plasticizers, particularly in vinyl chloride resins. More particularly the invention relates to plasticized vinyl chloride resins made by the incorporation of the esters.

The primary purpose of this invention is to provide new plasticized compositions having improved permanence. A further purpose of this invention is to provide useful general purpose plasticizers. A still further purpose of this invention is to provide a method of preparing compositions from vinyl chloride polymers.

It has been found that esters of the phenylbenzoic acids and aliphatic hydrocarbon alcohols, aliphatic oxa-hydrocarbon alcohols, and aliphatic thia-hydrocarbon alcohols having from 8 to 14 carbon, oxygen and sulfur atoms are excellent plasticizers for vinyl chloride polymers and the compositions made by the incorporation of the plasticizers in vinyl chloride resins have unusual low temperature flexibility and desirable low volatility. Suitable esters are the 2-ethylhexyl m-phenylbenzoate, the corresponding para- and ortho-phenylbenzoates, or mixtures thereof, and the various phenylbenzoates of n-hexyl, 2-methylheptyl, dodecyl, dimethylheptyl, 2-butoxyethyl, 2-thia-n-heptyl and isooctyl alcohols, butyl carbitol, and other homologous straight and branched alcohols having 8 to 14 atoms, including those having oxygen or divalent sulfur atoms substituted for methylene radicals in the radical chains.

The esters are valuable plasticizers for polyvinyl chloride and copolymers of more than 70 percent of vinyl chloride and up to 30 percent of other polymerizable monomers copolymerized therewith, for example vinyl acetate and other vinyl esters of monocarboxylic acids, ethyl maleate, ethyl fumarate and other alkyl esters of maleic and fumaric acids.

The plasticizers are blended with the vinyl resin in the conventional manner, for example by mixing on a roll mill, a Banbury type mixer or any other suitable mixing device. The plasticizers are used in proportions necessary to achieve the desired plasticity. Although the quantity of plasticizer will depend upon the particular polymer to be plasticized and upon its molecular weight it is generally found that from 5 to 50 percent of plasticizer will in most cases produce a satisfactory composition for general utility. Such quantity of plasticizer will generally remain as a permanent part of the vinyl resin and the modified vinyl resin so prepared will not deteriorate or become embrittled by reason of the loss of the plasticizer during use.

The value of the plasticizers are estimated by three tests (1) compatibility (2) volatility and (3) Clash-Berg flex temperature. The compatibility is determined by visual inspection, clarity being a requisite in most applications for vinyl chloride polymers. The volatility is estimated by the test of heating at 105° C. for 24 hours and measuring the percentage of the plasticizers evaporated by loss of weight. The Clash-Berg flex temperature is determined by cooling the polymer sample to about −50° C. and observing the change in the modulus of rigidity as the sample warms up to room temperature, the flex temperature being that at which the modulus of rigidity is 135,000 pounds per square inch. Of these tests the compatibility is of primary importance while the others are only critical for certain applications. If the polymer is to be subjected to outside weather conditions flex temperatures of −20 to −30° C. are desirable, otherwise 0° C. is satisfactory. If the polymer is to be subjected to elevated temperatures a volatility of 5 to 10 percent is advantageous, otherwise volatilities as high as 25 percent are often not objectionable. The volatilities and flex temperature, of polymer plasticizer blends are difficult to predict and often have no apparent relationship to the physical constants of the plasticizer.

The new plasticizers are of general utility in softening vinyl chloride polymers. They may be used as the only plasticizing component in a compounded vinyl chloride polymer or they may be used in conjunction with other plasticizers.

Further details of the practice of this invention are set forth with respect to the following specific examples.

Example 1

The butoxyethyl ester of phenylbenzoic acid was evaluated as a plasticizer by milling 40 parts by weight thereof and 60 parts of polyvinyl chloride and one part of a standard commercially available stabilizer. The thoroughly milled samples were molded into apropriate test pieces and tested by means of the Clash-Berg flex temperature procedure and for volatility. The compositions were found to have flex temperatures of −24° C. and a volatility of 7.2 percent.

Example 2

Using the procedure described in the preceding example the 2-ethylhexyl esters of phenylbenzoic acid was evaluated. It was found to have a flex temperature of −25° C. and a volatility of 8.9 percent.

Although the invention has been described with respect to specific embodiments, it is not intended that the details thereof shall be construed as limitations upon the scope of the invention except to the extent incorporated in the following claims.

What is claimed is:

1. A plasticized vinyl resin composition which comprises a vinyl chloride polymer containing intimately dispersed therein an ester of a phenylbenzoic acid and an aliphatic monohydric alcohol of the group consisting of hydrocarbon alcohols, oxa-hydrocarbon alcohols, thia-hydrocarbon alcohols, said alcohols having the total of 8 to 14 carbon, oxygen and sulfur atoms.

2. A vinyl resin composition which comprises polyvinyl chloride having intimately dispersed therein from 5 to 50 percent of an ester of a phenylbenzoic acid and an aliphatic alcohol of the group consisting of hydrocarbon alcohols, oxa-hydrocarbon alcohols, thia-hydrocarbon alcohols, said alcohols having the total of 8 to 14 carbon, oxygen and sulfur atoms.

3. A vinyl chloride resin which comprises a copolymer of at least 70 percent of vinyl chloride and up to 30 percent of a monomer of the group consisting of vinyl acetate, ethyl maleate and ethyl fumarate, said copolymers having intimately dispersed therein from 5 to 50 percent of an ester of a phenylbenzoic acid and an aliphatic monohydric alcohol of the group consisting of hydrocarbon alcohols, oxa-hydrocarbon alcohols, thia-hydrocarbon alcohols, said alcohols having a total of 8 to 14 carbon, oxygen and sulfur atoms.

4. A vinyl resin composition which comprises polyvinyl chloride having intimately dispersed therein from 5 to 50 percent of 2-ethylhexyl m-phenylbenzoate.

5. A vinyl resin composition which comprises a copolymer of at least 70 percent of vinyl chloride and up to 30 percent of ethyl maleate, said copolymers containing intimately dispersed therein from 5 to 50 percent of n-butoxyethyl m-phenylbenzoate.

6. A vinyl resin composition which comprises a copolymer of at least 70 percent of vinyl chloride and up to 30 percent of ethyl maleate, said copolymers containing intimately dispersed therein from 5 to 50 percent of 2-ethylhexyl meta-phenylbenzoate.

JOACHIM DAZZI.

REFERENCES CITED

The following references are of record in the file of this patent:

UNITED STATES PATENTS

| Number | Name | Date |
|---|---|---|
| 2,376,782 | Kilgore | May 22, 1945 |